(12) United States Patent
St-Pierre et al.

(10) Patent No.: US 7,303,831 B2
(45) Date of Patent: Dec. 4, 2007

(54) ANTIFREEZE COOLING SUBSYSTEM

(75) Inventors: Jean St-Pierre, Vancouver (CA);
Stephen A Campbell, Maple Ridge (CA); Mark K Watson, Langley (CA); Michael P Sexsmith, North Vancouver (CA)

(73) Assignee: Ballard Powers Systems Inc., Burnaby (CA)

( * ) Notice: Subject to any disclaimer, the term of this patent is extended or adjusted under 35 U.S.C. 154(b) by 111 days.

(21) Appl. No.: 10/865,630

(22) Filed: Jun. 10, 2004

(65) Prior Publication Data
US 2004/0224201 A1    Nov. 11, 2004

Related U.S. Application Data

(62) Division of application No. 09/763,819, filed as application No. PCT/CA99/00850 on Sep. 17, 1999, now abandoned.

(30) Foreign Application Priority Data
Sep. 22, 1998    (DE) ................................ 198 43 401
Sep. 23, 1998    (CA) .................................... 2247856

(51) Int. Cl.
*H01M 8/04*    (2006.01)
(52) U.S. Cl. .......................................... 429/13; 429/26
(58) Field of Classification Search ..................... None
See application file for complete search history.

(56) References Cited
U.S. PATENT DOCUMENTS
3,507,702 A    4/1970    Sanderson
3,576,677 A    4/1971    Keating, Jr. et al.

(Continued)

FOREIGN PATENT DOCUMENTS
DE    37 83 227    7/1988

(Continued)

OTHER PUBLICATIONS

Cnobloch et al., "Conversion of ethylene glycol with air in alkaline fuel cells" (abstract), Proceedings of International Power Sources Symposium, Brighton, UK, Sep. 25, 1978, Academic Press, NY, NY.

(Continued)

*Primary Examiner*—Jonathan Crepeau
(74) *Attorney, Agent, or Firm*—Seed IP Law Group PLLC

(57) ABSTRACT

Liquid cooled systems having coolant circulation loops must often operate in below freezing conditions. For instance, in various applications certain fuel cell systems must be able to tolerate repeated shutdown and storage in below freezing conditions. Conventional glycol-based coolants typically used for internal combustion engines are generally unsuitable for use in the associated fuel cell cooling subsystems due to the presence of additives and/or inhibitors which are normally included to deal with problems relating to decomposition of the glycol. With additives or inhibitors present, the coolant conductivity can be sufficiently high as to result in electrical shorting or corrosion problems. However, provided the purity of the coolant is maintained, a pure glycol and water coolant mixture may be used as a fuel cell system coolant to obtain suitable antifreeze protection. Adequate purity can be maintained by including an ion exchange resin unit in the cooling subsystem.

21 Claims, 8 Drawing Sheets

U.S. PATENT DOCUMENTS

| | | | |
|---|---|---|---|
| 3,964,930 A | 6/1976 | Reiser | |
| 4,706,737 A | 11/1987 | Taylor et al. | |
| 4,946,595 A | 8/1990 | Miller, Jr. | |
| 5,174,902 A | 12/1992 | Shubert et al. | |
| 5,200,278 A | 4/1993 | Watkins et al. | |
| 5,409,784 A | 4/1995 | Bromberg et al. | |
| 5,565,279 A * | 10/1996 | Fredley et al. | 429/26 |
| 5,681,456 A | 10/1997 | Delport | |
| 5,868,105 A | 2/1999 | Evans | |
| 6,013,385 A * | 1/2000 | DuBose | 429/17 |

FOREIGN PATENT DOCUMENTS

| | | |
|---|---|---|
| JP | 02-010664 | 1/1990 |
| JP | 04-306567 | 10/1992 |
| JP | 06-223855 | 8/1994 |
| JP | 07-108268 | 4/1995 |
| JP | 07-310070 | 11/1995 |
| JP | 08-017457 | 1/1996 |
| JP | 08-185877 | 7/1996 |
| JP | 09-022716 | 1/1997 |
| JP | 10-223249 | 8/1998 |
| JP | 2000-164233 | 6/2000 |

OTHER PUBLICATIONS

Dow Chemical Company, "AMBITROL®-Inhibited glycol-based coolants, Engineering and operating guide", Sep. 1991, pp. 2, 3, 10-13, Dow Chemical Company, Midland, MI.

* cited by examiner

ANTIFREEZE COOLING SUBSYSTEM

CROSS-REFERENCE TO RELATED APPLICATION(S)

This application is a divisional of U.S. patent application Ser. No. 09/763,819 filed Jul. 9, 2001, now abandoned entitled "Antifreeze Cooling Subsystem". The '819 application was filed under 35 U.S.C. 371 and claims priority benefits from International Application No. PCT/CA99/00850 filed Sep. 17, 1999, also entitled "Antifreeze Cooling Subsystem". The '850 application, in turn, claimed priority benefits from German Patent Application No. 19843401.4 filed Sep. 22, 1998, and Canadian Patent Application No. 2,247,856 filed Sep. 23, 1998. The '819 and '850 applications are each hereby incorporated by reference in their entirety.

FIELD OF THE INVENTION

The present invention relates to cooling subsystems for systems which may be stored at and started from temperatures below the freezing point of water. More particularly, the invention relates to glycol-based cooling subsystems and methods for obtaining satisfactory conductivity and corrosion characteristics using glycol-based coolants. The invention is particularly suitable for solid polymer fuel cell systems used in automotive applications and back-up or remote power plants.

BACKGROUND OF THE INVENTION

Fuel cell systems have been in use for specialty applications (for example, space capsules, sensors) and have been under development for broader applications (for example, stationary power plants, transportation) for many years now. With continued advances, performance has been improved and costs have been reduced such that many of these latter fuel cell systems under development are entering commercial use. However, in order to meet the needs of a less specialized market, these fuel cell systems must be able to handle a wide range of user conditions, ideally with minimal additional complexity to the system. For instance, the ambient temperature and duty cycle can vary widely in different applications. It can be a challenge to meet these requirements, particularly when the application involves frequent storage and start-up in cold conditions.

A particularly attractive fuel cell is the solid polymer electrolyte fuel cell. This type of fuel cell employs an ion conducting membrane as the electrolyte. An individual solid polymer fuel cell generally comprises a membrane electrode assembly (MEA) containing an ion conducting membrane interposed between a cathode and an anode. The ion conducting membrane in the MEA serves as a separator as well as the electrolyte. Catalyst, for promoting the reactions in the fuel cell, is located at the interface between the electrodes and the membrane. Generally, flow field plates are positioned adjacent to each electrode for purposes of distributing the fuel and oxidant reactants to the appropriate electrodes. The flow field plates also typically serve as current collectors, electrode supports, and separators. Since the operating voltage of an individual cell is usually under 1 volt, most fuel cell systems employ numerous cells that are stacked in series to create a higher voltage fuel cell stack.

The electrochemical reactions in a PEM fuel cell proceed more favorably at higher temperatures. However, the operating temperature must be limited in order to prevent damage to the membrane material. The typical operating temperature of a hydrogen-fueled solid polymer fuel cell is under 100° C., which is relatively low compared to other types of fuel cells. Since the electrochemical reaction between fuel and oxidant is exothermic, temperature regulation generally involves cooling of the solid polymer fuel cell stack, hence the temperature regulating subsystem is commonly called the cooling subsystem. (However, the cooling subsystem might also desirably serve as a heating subsystem during cold start-up in order to bring the fuel cell up to the desired operating temperature more quickly.) Solid polymer fuel cell systems are typically liquid-cooled rather than air-cooled especially if higher power densities (power output capability per unit volume) are desired. The reason is that the cooling subsystems typically must shed a significant amount of heat at relatively low temperature (circa 80° C.) with respect to ambient. The use of more efficient liquid-as opposed to air-cooling allows the fuel cell stack cooling channels to be made smaller and hence a lower overall stack volume can be obtained.

In some stationary power applications, a fuel cell system may operate uninterrupted for long periods, albeit at varying power levels. However, more commonly perhaps, a fuel cell system is subjected to frequent on-off cycles and hence it goes through numerous cold starts. For outdoor applications in cold climates, this can mean frequent shutdowns and storage in sub-zero temperatures. The fuel cell system, and particularly the cooling subsystem, must therefore be able to handle repeated storage below freezing without significant degradation. For example, this requirement applies to fuel cell systems for automotive use.

Today's liquid-cooled, internal combustion engine powered automobiles face a similar requirement. To prevent freezing and hence rupturing of the cooling subsystems therein, antifreeze is added to the aqueous coolant. The antifreeze added is typically ethylene glycol but other antifreeze coolants such as propylene glycol, alcohols, and the like can be used. Ethylene glycol transfers heat well, has superior heat capacity, and poses less of a fire hazard (for example, has a flash point greater than 100° C.). Depending on the concentration, an aqueous mixture of ethylene glycol stops the coolant from freezing at temperatures down, for example, to −40° C.

Along with an antifreeze coolant, other additives are used in aqueous automotive and other industrial cooling subsystems in order to slow the corrosion of the metallic components in the coolant circulation loop of the cooling subsystem. For instance, silicates are commonly added to automotive coolants in order to protect aluminum components in the circulation loop. While corrosion is an issue with any aqueous coolant, corrosion can be accelerated by the use of certain antifreeze coolants. Unlike water, ethylene glycol and propylene glycol decompose in the presence of oxygen to form acidic by-products such as glycolic and lactic acids respectively. The presence of these by-products can significantly accelerate corrosion in a coolant circulation loop. Further, the rate of decomposition increases with temperature and in the presence of transition metals. Thus, the high temperatures (circa 200° C.) and metal constructions of conventional automotive coolant circulation loops significantly increase the rate of glycol decomposition and hence corrosion. For this reason, inhibitors (for example, buffers) can also be added to the glycol-based coolants in order to reduce the decomposition of the glycol. Further, cooling subsystems are typically closed (sealed) when operating at temperatures above about 60° C. in order to avoid rapid oxidation of the glycol. More details on this subject can be found in Dow Chemical Company's "Engineering and Operating Guide for Ambitrol Inhibited Glycol-based Coolants", September 1991.

Historically, glycols, such as ethylene glycol, have been used in alkaline fuel cell systems as the fuel itself. Glycol-based coolants have been suggested for use in the cooling subsystems of certain fuel cell systems. For instance, U.S. Pat. No. 3,507,702 suggests the use of ethylene glycol in the coolant circuit for an aqueous alkali electrolyte fuel cell. Therein, the embodiments and discussion pertain to low voltage fuel cell stacks (for example, 30 V or less) and thus there would be no significant concern about electrical shock hazards through the coolant fluid. There is no discussion regarding corrosion, additives/inhibitors, or removal of ions in the coolant subsystem. Japanese published patent application number 08-185877 discloses an antifreeze coolant system employing ethylene glycol wherein pure water for humidification is obtained via ultrafiltration from the antifreeze coolant. However, no means for maintaining the purity of the antifreeze coolant over time appears to have been provided.

The coolant subsystem in high voltage fuel cell stacks (above about 50 V) can, however, present an electrical shock hazard. If the coolant is sufficiently conductive and is in electrical contact with and interconnects parts of the fuel cell stack that are at different potentials, the coolant fluid can pose a safety problem. Further, the coolant also provides a path for the flow of undesirable corrosion currents. These problems are discussed and addressed in U.S. Pat. No. 3,964,930 wherein various means of electrical isolation (such as coolant tube coatings) are employed in combination with a water-based coolant. A conductivity of less than about 50 µS/cm is stated to be preferred for the water coolant.

Generally, the electrical conductivity of an aqueous coolant increases with the concentration of ions in solution. In some conventional high voltage fuel cell systems, shock and corrosion current concerns are dealt with by using substantially pure de-ionized water as the coolant. An acceptable level for the conductivity of the de-ionized coolant is considered to be of order of 5 µS/cm or less.

Substantially pure, de-ionized water is also desirably used in coolant loops where there is a possibility of the coolant contaminating or damaging MEA components (such as the electrocatalyst and membrane electrolyte) of the fuel cell. Since pure, de-ionized water is fundamentally compatible with the MEA components, fuel cell design and construction may be simplified to allow some contact of the coolant with the MEA components. Note that, even in constructions that attempt to prevent such contact (for example, constructions having isolated piping or redundant seals), there can still be reliability concerns regarding contact resulting from occasional leaks.

Ion exchange resin units and other filters are frequently employed in de-ionized water coolant loops of fuel cell systems to continually remove contaminants and thereby ensure that the water coolant fluid remains substantially free of ionic contaminants. For example, U.S. Pat. No. 5,200,278 discloses a fuel cell system having de-ionized liquid water coolant that is also used for membrane humidification of inlet reactant streams. The water is preferably de-ionized using ion exchange resin units in the loop.

Where tolerance to freezing is required, conventional glycol-based antifreeze coolants containing additives may be used in high voltage, fuel cell systems. However, the coolant subsystem should be reliably isolated electrically and physically from the MEAs in the fuel cell stack, so that electrical shock, corrosion shorting, and contact with the MEA components are not a concern. The use of glycol without additives/inhibitors might be considered as an alternative to isolating the cooling subsystem but it adds to corrosion concerns over those posed by use of water alone, due to the decomposition of glycol into acidic by-products. Consequently, it appears that the use of glycols has been avoided in the coolant of high voltage fuel cell systems that do not have electrically isolated cooling subsystems.

Other antifreeze solvents such as other alcohols and dielectric fluids have been contemplated but these may introduce a significant fire hazard (for example, due to a lower flash point) and/or have poorer heat transfer and capacity characteristics. Instead, solutions have been developed to cope with subzero conditions using pure water coolants, for example, by keeping the system above zero degrees or by removing all water from the system prior to shutdown.

SUMMARY OF THE INVENTION

Improved cooling subsystems for liquid-cooled systems (for example, liquid-cooled fuel cell systems used in fuel cell powered vehicles or other applications), and methods for providing simplified antifreeze and corrosion protection therein are provided. A cooling subsystem for cooling a fuel cell stack includes a liquid coolant and a circulation loop for circulating the liquid coolant in thermal contact with fuel cells in the stack. The liquid coolant includes a glycol solvent for antifreeze protection and may be a glycol/water mixture. The ratio of glycol to water may be selected to give the desired antifreeze protection, for instance about 1:1. However, the glycol-containing liquid coolant is characterized by a conductivity less than about 50 µS/cm and this level is maintained during operation of the fuel cell system by including means for maintaining the purity of the liquid coolant in the cooling subsystem. A conductivity of less than about 5 µS/cm is preferred.

A preferred means for maintaining the desired purity of the liquid coolant is to incorporate an ion exchange resin unit in the circulation loop of the cooling subsystem whereby ionic decomposition products of the glycol solvent are removed from the liquid coolant. The ion exchange resin unit may comprise an alkaline anion resin and, optionally, an acidic cation resin. A suitable ion exchange resin unit may employ, for example, a hydroxide type 2 strong base anion exchange resin.

Use of ion exchange resin units in glycol-based coolant loops can be a practical solution for achieving antifreeze protection under the operating conditions of certain fuel cell systems. For instance, in solid polymer fuel cell stacks operating at less than about 100° C., the extent of glycol decomposition may be limited such that an ion exchange resin unit can provide months of service before needing replacement. Further, since conductivity levels less than about 5 µS/cm can be achieved, the use of an ion exchange resin unit in the coolant loop is suitable for fuel cell systems operating at hundreds of volts.

A glycol solvent is defined herein as one which does not contain the inhibitors and/or additives commonly present in commercial antifreeze glycol solutions. In the absence of such additives and/or inhibitors, decomposition of the glycol solvent is the main source of impurities in the cooling subsystem leading to high coolant liquid conductivities. If the liquid coolant is in electrical contact with fuel cells in the fuel cell stack, high coolant conductivities result in shock and corrosion current problems in high voltage fuel cell systems. Herein, high voltage refers to systems comprising fuel cell stacks operating above about 50 volts.

The glycol solvent employed may be selected from the more common glycols, such as ethylene glycol, propylene glycol, polyethylene glycol, and polypropylene glycol.

Ethylene glycol has been found to be more compatible with the membrane electrode assemblies of solid polymer fuel cells and is therefore a preferred choice.

The circulation loop of the cooling subsystem may comprise aluminum hardware which is exposed to the liquid coolant. In order to reduce decomposition of the glycol solvent, the coolant circulation loop in the cooling subsystem is preferably essentially isolated from air.

BRIEF DESCRIPTION OF THE DRAWING(S)

DETAILED DESCRIPTION OF PREFERRED EMBODIMENT(S)

A fuel cell system of the invention is liquid-cooled and includes a fuel cell stack, a liquid coolant, and a circulation loop for circulating the liquid coolant in thermal contact with fuel cells in the stack. The liquid coolant comprises a glycol solvent for antifreeze protection. Preferably, a glycol/water mixture is used as the liquid coolant. The ratio of glycol to water is selected to provide the desired level of protection against freezing (a 1:1 ratio provides protection down to about −40° C. and is not flammable). Simplified protection against electrical shock and corrosion current problems in high voltage fuel cell stacks is provided by suitable means for maintaining the purity and hence the conductivity of the liquid coolant below about 50 µS/cm.

Figure 1A:
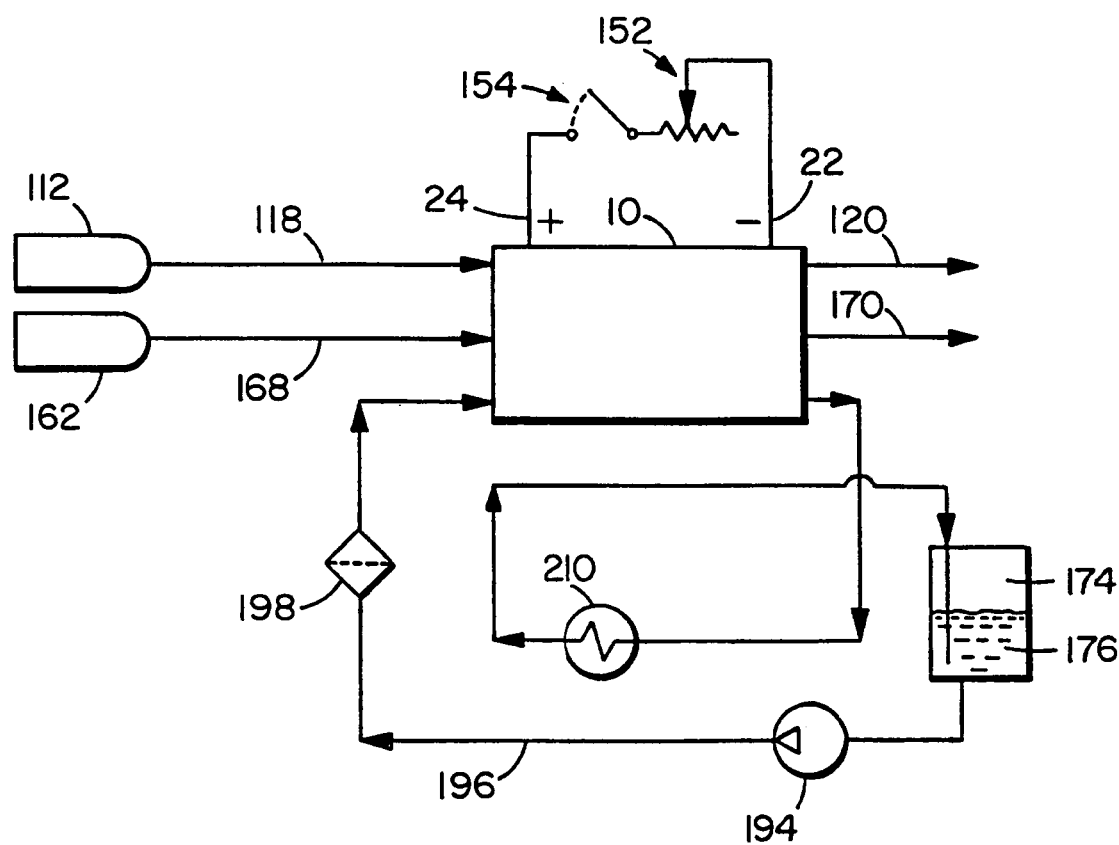
FIG. 1a is a schematic diagram of an embodiment of a solid polymer fuel cell system which includes a sealed coolant subsystem comprising a glycol-based coolant and an ion exchange resin unit.

FIG. 1a shows a schematic of a preferred fuel cell system comprising a high voltage solid polymer fuel cell stack 10, a glycol/water liquid coolant 176, a circulation loop 196, and an ion exchange resin unit 198 in the circulation loop 196.

The circulation loop 196 also includes a circulation pump 194 and a heat exchanger 210. In this schematic drawing, a supply of glycol/water liquid coolant 176 is provided in reservoir 174.

The solid polymer fuel cell system of FIG. 1a may be conventional in other respects. Reactant streams, fuel 112 and oxidant 162, are supplied to fuel cell stack 10 via inlets 118 and 168 respectively. Usually, for gaseous reactants, one or both of the reactant streams are humidified before being supplied to the fuel cell stack to prevent the membrane electrolyte from drying out. The fuel and oxidant exhaust streams exit the stack through outlets 120 and 170 respectively. If, for example, substantially pure hydrogen is used as the fuel, the fuel exhaust can be recirculated so fuel is not wasted. Useable electric power is obtained via the depicted external circuit comprising negative and positive bus plates 22 and 24 respectively, variable load 152 and contactor switch 154.

The ion exchange resin unit 198 contains at least an anion exchange resin to remove ionic decomposition products of the glycol solvent. Suitable anion exchange resins include an hydroxyl type 2 strong base anion resin. Cation exchange resin units and/or other filtration units (for example, charcoal filters) may optionally be incorporated as well to eliminate other impurities that may accumulate in the coolant loop.

Figure 1B:
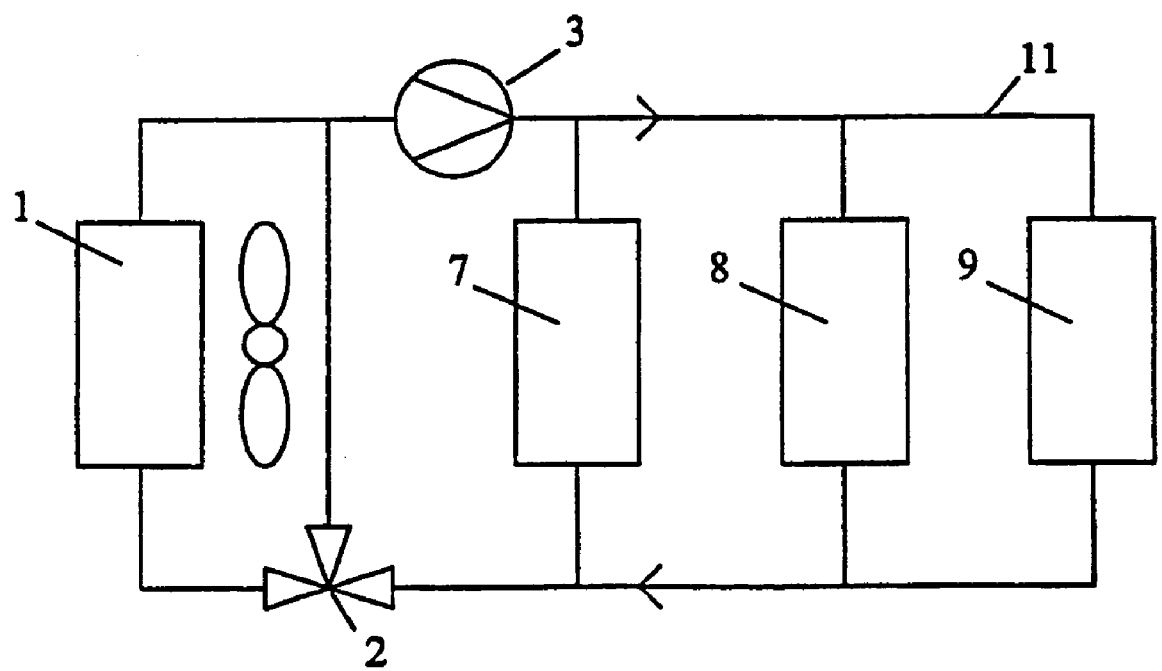
FIG. 1b is a schematic diagram of an embodiment of a solid polymer fuel cell system for a fuel cell powered vehicle which includes a sealed coolant subsystem comprising a glycol-based coolant and an ion exchange resin unit.

An embodiment of a fuel cell system for a fuel cell powered vehicle is shown in the schematic diagram of FIG. 1b. Therein, coolant is pumped through circulation loop 11 by pump 3. As shown, circulation loop 11 branches into three parallel lines leading to a heat exchanger 7, ion exchange resin unit 8, and fuel cell 9. The coolant is then directed into a single line again to thermostatic valve 2. Depending on the coolant temperature, the coolant can be directed by thermostatic valve 2 to radiator 1 for cooling or can be directed to by-pass radiator 1 and go directly to pump 3. Ion exchange resin unit 8 may be placed at other locations in circulation loop 11. It is also possible to employ more than one ion exchange unit in the circulation loop.

Figure 1C:
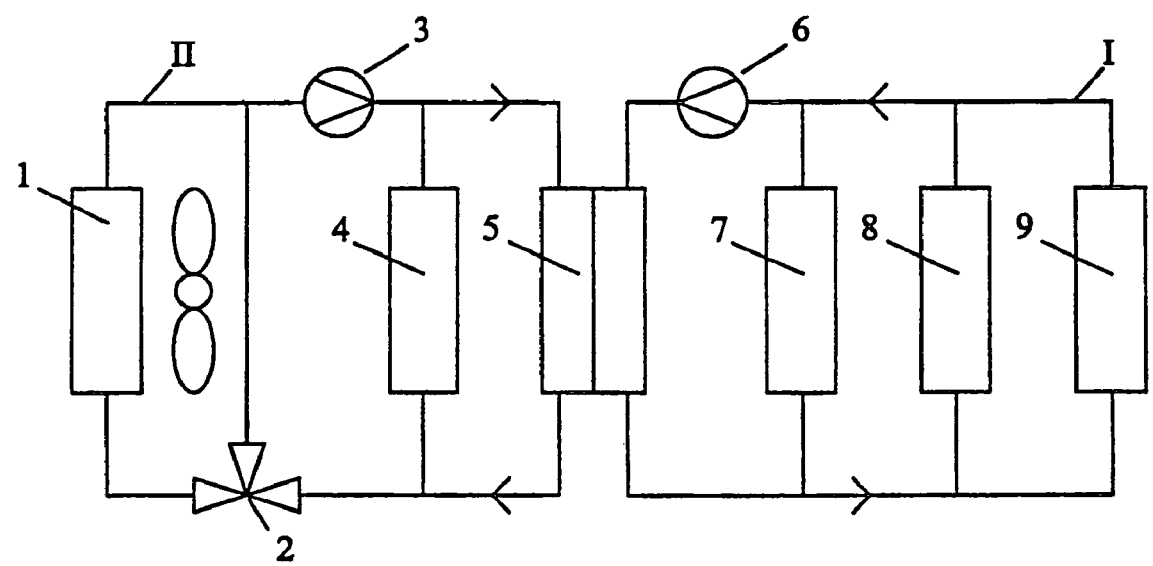
FIG. 1c is a schematic diagram of an alternative embodiment of a solid polymer fuel cell system for a fuel cell powered vehicle which includes a sealed coolant subsystem comprising a glycol-based coolant and an ion exchange resin unit.

An alternative embodiment of a fuel cell system comprising two coolant circulation loops for a fuel cell powered vehicle is shown in the schematic diagram of FIG. 1c. In a like manner to FIG. 1b, high purity glycol/water coolant (for example, having a conductivity below about 50 µS/cm) is pumped through first circulation loop I by pump 6. As shown, first circulation loop I branches into three parallel lines leading to a heat exchanger 7, ion exchange resin unit 8, and fuel cell 9. The coolant is then directed into a single line to another heat exchanger 5 in which heat is exchanged between the coolant in first circulation loop I and the coolant in second circulation loop II. Circulation loop II however does not contain an ion exchange resin unit and the coolant therein may comprise a mixture of water and commercial antifreeze solution containing inhibitors and/or other additives. Coolant is pumped through second circulation loop II by pump 3 and, as shown, branches into two parallel lines leading to heat exchangers 4 and 5. Again, depending on the coolant temperature, the coolant can be directed by thermostatic valve 2 to radiator 1 for cooling or can be directed to by-pass radiator 1 and go directly to pump 3.

The glycol solvent employed can be one of the more common glycols, such as ethylene glycol, propylene glycol, polyethylene glycol, and polypropylene glycol. Ethylene glycol is a preferred antifreeze solvent in other applications for reasons of viscosity, heat exchanger efficiency, and freezing point depression. Further, it seems to be reasonably compatible with certain membrane electrode assemblies and thus is a preferred solvent in case of subsystem leaks that might result in contact of the coolant with a membrane electrode assembly. Optionally, a mixture comprising more than one glycol solvent might be used in the liquid coolant.

Experimentation has shown that the decomposition rate of the glycol and the corrosion of aluminum hardware exposed to the coolant at the typical operating temperatures of solid polymer fuel cells does not overwhelm a conventional ion exchange resin unit. Thus, aluminum components, for example, a radiator, may be used in the circulation loop. Other metals or plastic components might be used but they must be screened in order to determine if they either accelerate glycol decomposition or corrode to produce soluble ionic impurities in the pure coolant (for example, some stainless steel components will accelerate decomposition but will not themselves corrode). However, in order to reduce the decomposition of the glycol solvent, the circulation loop in the cooling subsystem should be sealed so that the coolant is not freely exposed to air. Also, the use of dissimilar metals in the coolant loop may lead to galvanic corrosion and this is to be avoided where possible.

In this way, the conductivity of the glycol-containing coolant can be kept acceptably low (below about 5 µS/cm) for reasonable lengths of time (months). Further, the pH of the coolant can also be kept desirably neutral. Thus, use of an ion exchange unit in the cooling subsystem represents a simplified method of protecting against electrical shock and corrosion current using an antifreeze coolant.

However, other means for maintaining the necessary purity of the coolant might be employed instead. For instance, means for suitably reducing the rate of decomposition might be used instead of means for removing the ionic impurities after decomposition takes place. An alternative might therefore involve scavenging oxygen in the circulating coolant thereby retarding the decomposition rate (for example, by bubbling the fuel exhaust stream through a coolant reservoir or using a de-oxidizing resin such as Purolite™ A310LC that removes dissolved oxygen).

The following examples have been included to illustrate different embodiments and aspects of the invention but these should not be construed as limiting in any way.

EXAMPLE 1

Figure 2:
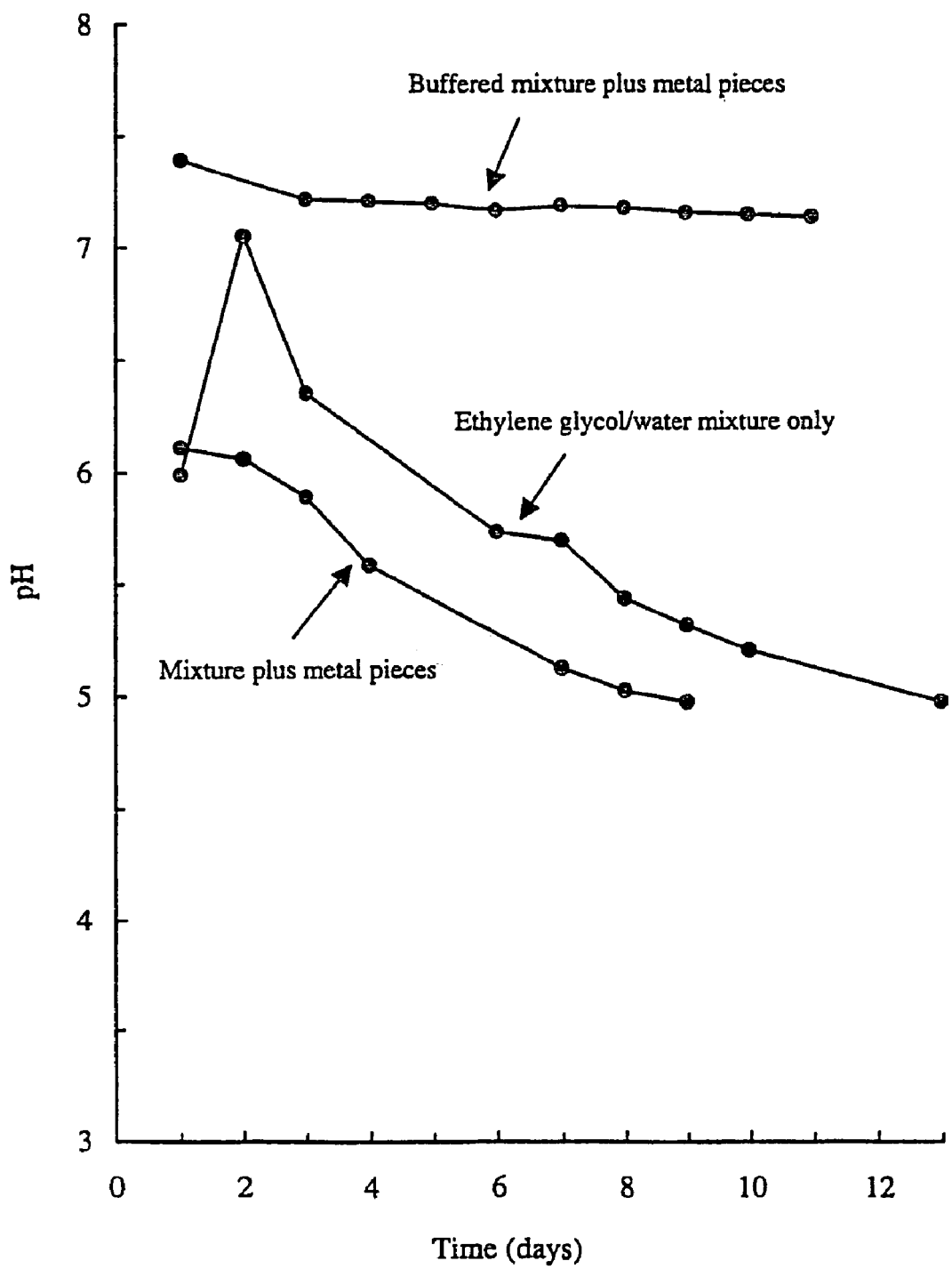
FIG. 2 shows the pH versus time of the comparative and test glycol/water mixtures exposed to metal pieces in Example 1.

Three flasks containing a 1:1 mixture of reagent grade ethylene glycol and de-ionized water were prepared. The first flask was left as is. Pieces of both aluminum and steel were placed in each of the second and third flasks. The third flask also contained a sodium phosphate pH buffer. The flasks were then stored at 80° C. in air, and pH and AC conductivity measurements (at 1 KHz) were taken at periodic intervals. FIG. 2 shows the pH of the three water/glycol mixtures versus time. The pH in both unbuffered mixtures fell significantly over a period of about 10 days. The decrease was somewhat faster for the mixture in the second flask presumably due to the presence of the metal pieces. The conductivity of both unbuffered mixtures (the first and second flasks) stayed in the range from about 10-20 µS/cm for the monitoring period. The pH of the buffered mixture in the third flask remained substantially neutral (pH about 7) over the same period, but its conductivity was about 1000 US/CM due to the presence of the buffer.

This example illustrates that the pH of an unbuffered de-ionized ionized water/ethylene glycol mixture may be unacceptable (too acidic) in a fuel cell cooling system in just a few days. A conventionally buffered solution may maintain an acceptable pH but has an unacceptably high conductivity (>>50 µS/cm).

EXAMPLE 2

Approximately 10 liters of a 1:1 mixture of commercial automotive antifreeze (containing ethylene glycol and inhibitors) and de-ionized water was prepared and the conductivity was measured to be over 1000 µS/cm. The mixture was then circulated in a circulation loop comprising an ion exchange resin unit to remove ions present in the commercial antifreeze. The ion exchange resin unit contained 500 mL of a strong base type 2 anion resin. Also, the unit contained 500 mL of a sulfonic acid type cation resin and 500 mL of activated carbon. The hardware which contacted the coolant mixture in the circulation loop included an aluminum radiator, 316 stainless steel fittings, and either PTFE or Ultem™ (product of GE Plastics) plastics.

Figure 3:
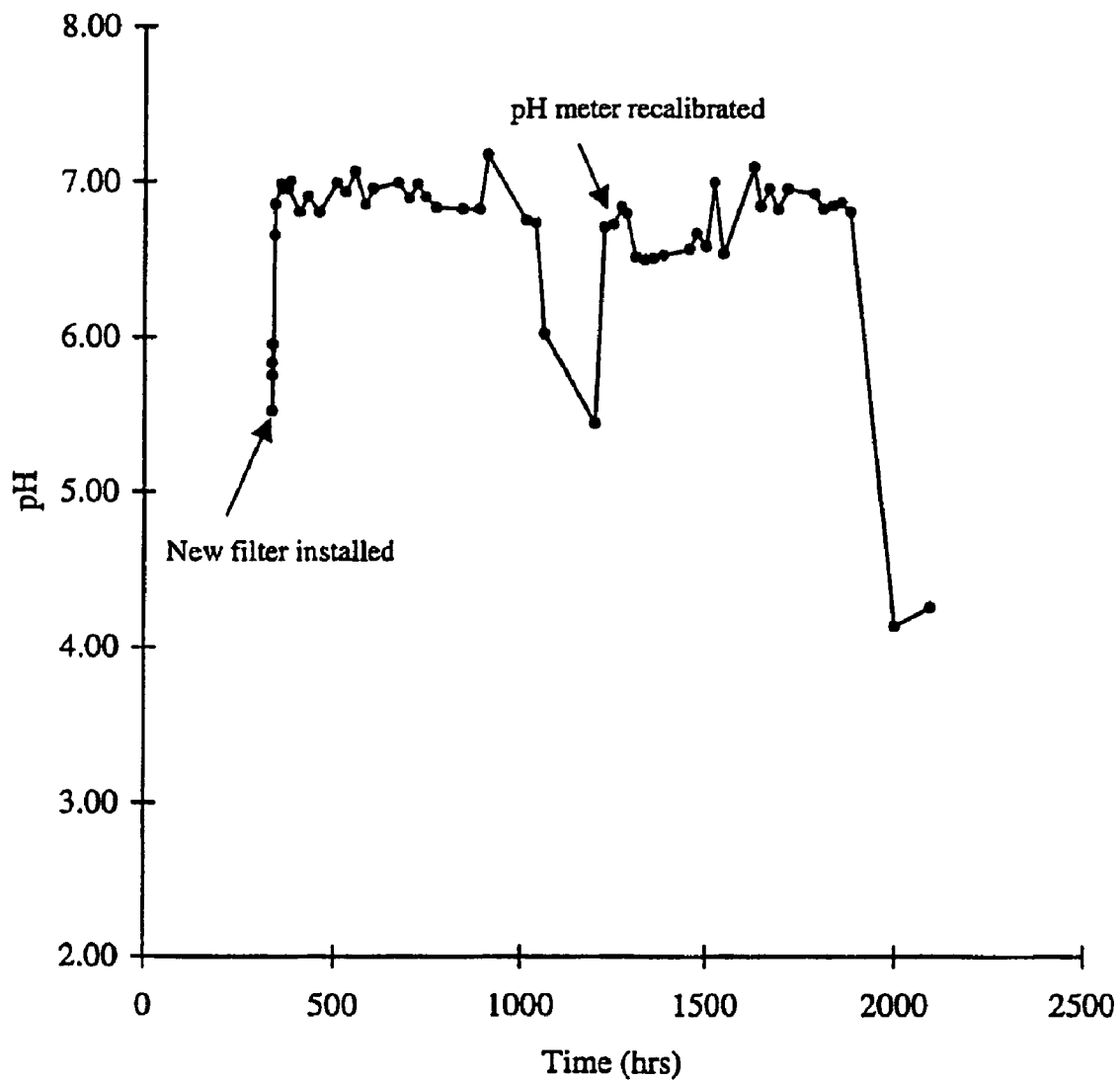
FIG. 3 shows the pH versus time for the glycol/water mixture of Example 2 wherein an ion exchange resin unit is employed to maintain the purity of the mixture.
Figure 4:
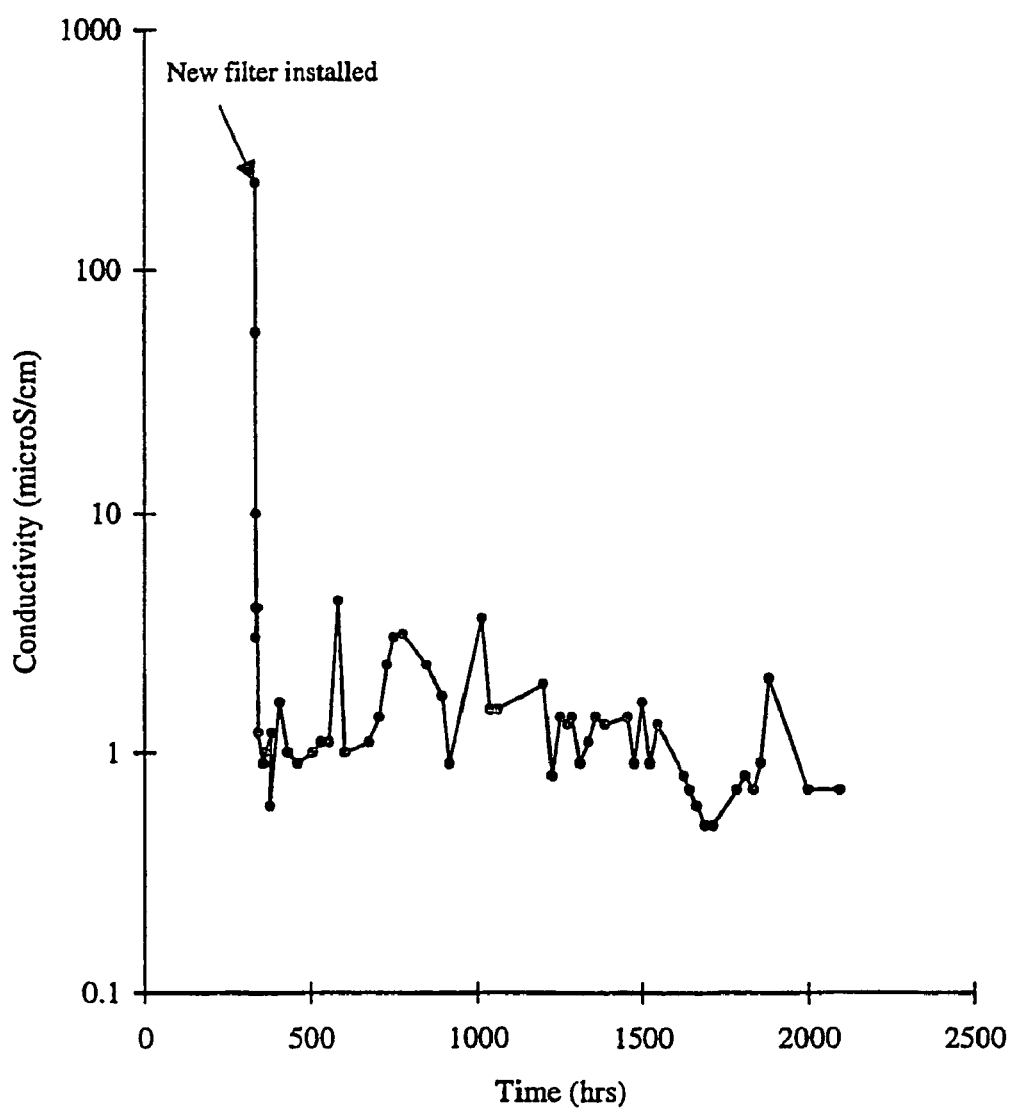
FIG. 4 shows the conductivity versus time for the glycol/water mixture as above wherein an ion exchange resin unit is employed to maintain the purity of the mixture.

After a period, the ion exchange cartridge was presumed to be saturated and was replaced. Circulation continued with the circulation loop isolated from air at 80° C. Again, pH and conductivity measurements were taken at periodic intervals. FIGS. 3 and 4 show the pH and conductivity of the mixture respectively versus time.

When the replacement cartridge was initially installed, the mixture had a undesirably low pH of about 5.5 and an undesirably high conductivity of about 300 µS/cm. However, shortly thereafter the mixture was sufficiently purified such that a pH of about 7 and a conductivity of less than 5 µS/cm were obtained. These levels were maintained for over 60 days whereupon the pH of the mixture began to fall, presumably as a result of saturation of the ion exchange cartridge with decomposition products from the ethylene glycol. (Note that FIG. 3 shows an apparent temporary drop in pH after about 900 hours which was due to pH meter error.)

This example shows that an acceptable pH and conductivity can be obtained and maintained using an ethylene glycol/water liquid coolant in combination with an ion exchange resin unit. Although the ion exchange unit may need periodic replacement or servicing, the frequency is of order of every few months, not hours, and is thus practical.

EXAMPLE 3

A liquid-cooled fuel cell system equipped with a glycol-based cooling subsystem and ion exchange resin unit in the coolant circulation loop was operated for about 1000 hours at 80° C. The components present in the circulation loop included a radiator, heat exchangers, circulation pump and housing, and coolant lines. The coolant comprised 50% ethylene glycol and 50% water by volume. The ion exchange resin unit comprised a mixed-bed of a strongly acidic cation exchange resin and a strongly alkaline anion exchange resin. After 1000 hours of operation, the components in the circulation loop were examined and showed no significant corrosion. The conductivity of the coolant after 1000 hours of operation was also measured and was found to be less than 10 µS/cm.

This example confirms that such a liquid-cooled fuel cell system can be operated for a substantial period of time without suffering significant corrosion and without needing replacement or servicing of the ion exchange unit.

EXAMPLE 4

Various individual PEM fuel cells were constructed and operated for purposes of evaluating the effect of glycol exposure on the MEA therein. The MEAs comprised electrodes made of platinum loaded carbon fiber paper and a Nafion™ 112 membrane electrolyte. Pressurized and humidified air and hydrogen gases were used as the reactants and the test fuel cells operated at about 80° C.

Figure 5:
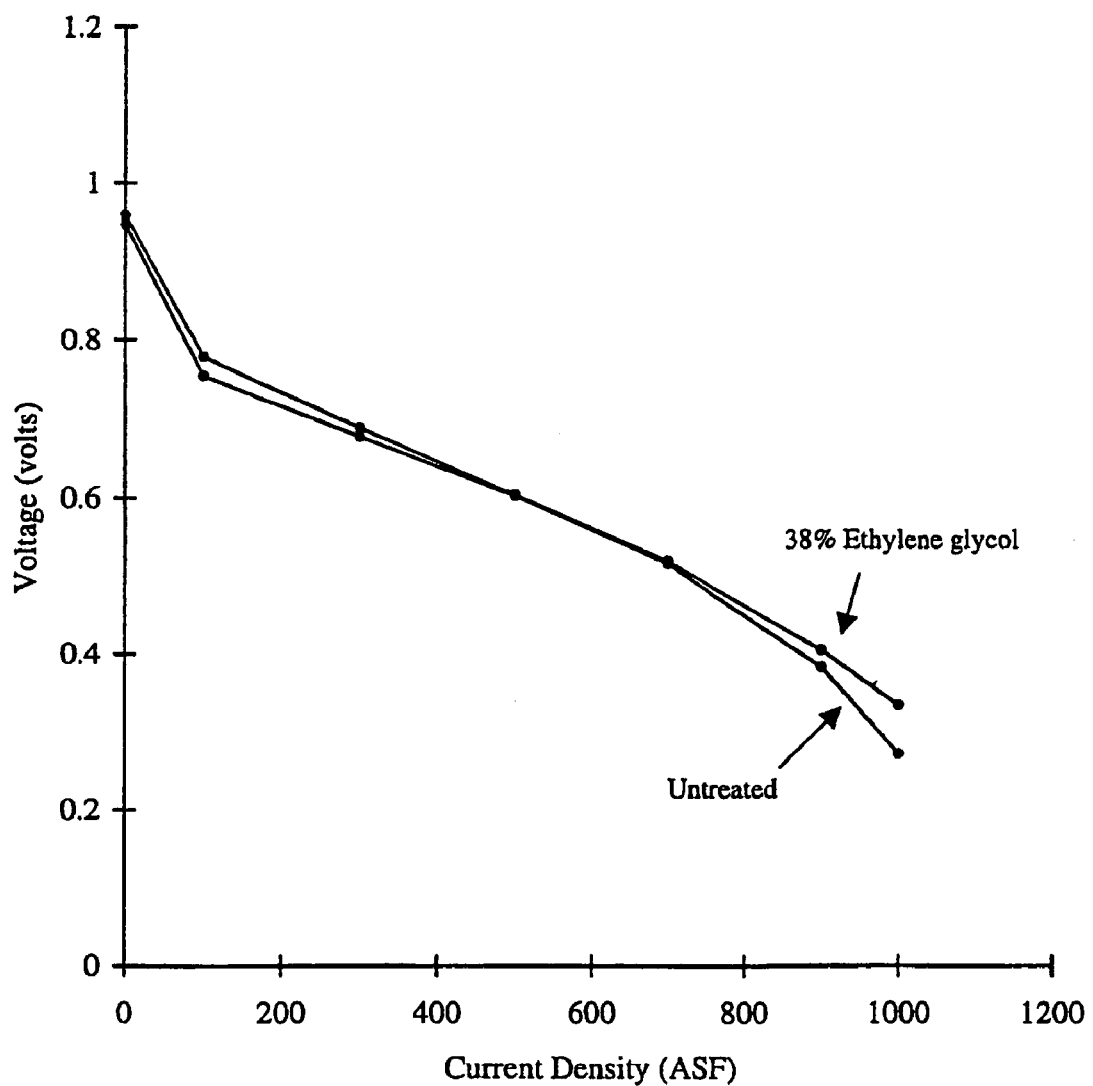
FIG. 5 shows the voltage versus current density for the test fuel cell and the comparative fuel cell of Example 3 wherein the membrane electrode assembly of the test fuel cell was exposed to an ethylene glycol/water mixture.

In one trial, a 0.38:0.62 mixture of reagent grade ethylene glycol and de-ionized water was prepared and manually painted on the cathode of a test fuel cell before construction, thereby exposing the cathode to ethylene glycol. A similar fuel cell was also constructed without treating with ethylene glycol for comparative purposes. The two fuel cells were then tested for power output. FIG. 5 shows the voltage versus current density performance characteristics for the ethylene glycol treated test cell and the untreated comparative cell. There was no significant difference in the performance characteristics.

Figure 6:
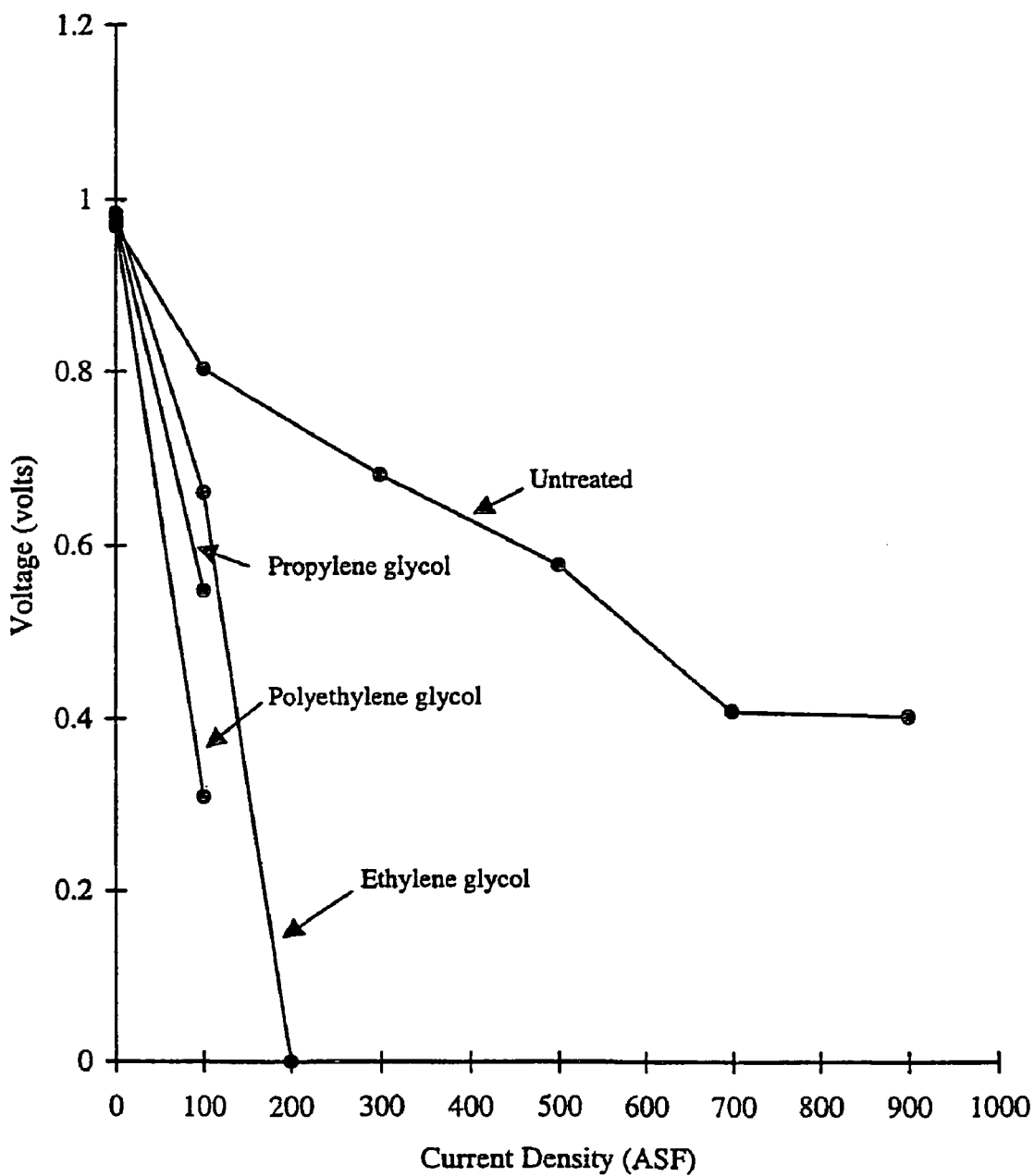
FIG. 6 shows the voltage versus current density for the test fuel cells and the comparative fuel cell of Example 3 wherein the membrane electrode assemblies of the test fuel cells were exposed to various glycol solvents.

In another trial, various unmixed reagent grade glycol solvents (that is, ethylene glycol, propylene glycol, polyethylene glycol, and polypropylene glycol) were painted on the electrodes of a series of test fuel cells prior to construction. Again, an untreated comparative fuel cell and the test fuel cells were tested. FIG. 6 shows the voltage versus current density performance characteristics for these fuel cells. Here, the fuel cell treated with unmixed ethylene glycol performed slightly worse than the untreated comparative fuel cell. The fuel cells treated with propylene glycol and polyethylene glycol showed progressively worse performance respectively. The fuel cell treated with polypropylene glycol would not operate at 100 amps per square foot (ASF) and thus its performance is not shown.

This example shows that fuel cell performance can still be acceptable even if the MEA is exposed to a glycol solvent employed in the cooling subsystem. Of the glycols tested, ethylene glycol seems most compatible with the MEA and is thus preferred.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A liquid-cooled fuel cell system including a high voltage fuel cell stack that operates at voltages greater than about 50 volts during operation and a cooling subsystem for cooling the high voltage fuel cell stack, the cooling subsystem including a liquid coolant and a circulation loop for circulating the liquid coolant in thermal and electrical contact with fuel cells in the high voltage fuel cell stack, and the liquid coolant including a glycol solvent, wherein:
the liquid coolant is characterized by a conductivity less than about 50 μS/cm; and the cooling subsystem additionally comprises means for maintaining the purity of the liquid coolant such that the conductivity of the liquid coolant is less than about 50 μS/cm during operation of the high voltage fuel cell stack.

2. The liquid-cooled fuel cell system of claim 1 wherein the high voltage fuel cell stack is a solid polymer fuel cell stack.

3. The liquid-cooled fuel cell system of claim 2 wherein the solid polymer fuel cell stack comprises membrane electrode assemblies in contact with the liquid coolant in the circulation loop.

4. The liquid-cooled fuel cell system of claim 2 wherein the solid polymer fuel cell stack operates at temperatures less than 100° C.

5. The liquid-cooled fuel cell system of claim 1 wherein the means for maintaining the purity of the liquid coolant comprises an ion exchange resin unit in the circulation loop of the cooling subsystem.

6. The liquid-cooled fuel cell system of claim 5 wherein the ion exchange resin unit employs a hydroxide type 2 strong base anion exchange resin.

7. The liquid-cooled fuel cell system of claim 1 wherein the liquid coolant is characterized by a conductivity less than about 5 μS/cm and the cooling subsystem additionally comprises means for maintaining the purity of the liquid coolant such that the conductivity of the liquid coolant is less than about 5 μS/cm during operation of the high voltage fuel cell stack.

8. The liquid-cooled fuel cell system of claim 1 wherein the glycol solvent is selected from the group consisting of ethylene glycol, propylene glycol, polyethylene glycol, and polypropylene glycol.

9. The liquid-cooled fuel cell system of claim 8 wherein the glycol solvent is ethylene glycol.

10. The liquid-cooled fuel cell system of claim 1 wherein the liquid coolant additionally comprises water.

11. The liquid-cooled fuel cell system of claim 10 wherein the glycol solvent to water ratio in the liquid coolant is about 1:1.

12. The liquid-cooled fuel cell system of claim 1 wherein the liquid coolant in the circulation loop is essentially isolated from air.

13. The liquid-cooled fuel cell system of claim 1 wherein the circulation loop comprises aluminum hardware exposed to the liquid coolant.

14. A method of providing antifreeze and corrosion protection for a fuel cell system, the fuel cell system including a high voltage fuel cell stack that operates at voltages greater than about 50 volts during operation and a cooling subsystem for cooling the high voltage fuel cell stack, and the cooling subsystem including a liquid coolant and a circulation loop for circulation the liquid coolant in thermal and electrical contact with fuel cells in the high voltage fuel cell stack, wherein the method comprises:
lowering the freezing temperature of the liquid coolant by incorporating a glycol solvent in the liquid coolant, wherein the liquid coolant is characterized by a conductivity less than about 50 μS/cm; and
maintaining the purity of the liquid coolant in the cooling subsystem such that the conductivity of the liquid coolant remains less than about 50 μS/cm during operation of the high voltage fuel cell stack.

15. The method of claim 14 wherein the high voltage fuel cell stack is a solid polymer fuel cell stack.

16. The method of claim 14 wherein the liquid coolant is circulated through an ion exchange resin unit in the circulation loop of the cooling subsystem.

17. The method of claim 16 wherein the ion exchange resin unit employs a hydroxide type 2 strong base anion exchange resin.

18. The method of claim 14 wherein the liquid coolant is characterized by a conductivity less than about 5 μS/cm and the purity of the liquid coolant in the cooling subsystem is maintained such that the conductivity of the liquid coolant remains less than about 5 μS/cm during operation of the high voltage fuel cell stack.

19. The method of claim 14 wherein the glycol solvent used in the liquid coolant is selected from the group consisting of ethylene glycol, propylene glycol, polyethylene glycol, and polypropylene glycol.

20. The method of claim 19 wherein the glycol solvent used in the liquid coolant is ethylene glycol.

21. The method of claim 14 additionally comprising essentially isolating the liquid coolant in the circulation loop from air.

* * * * *